United States Patent [19]

Dailey et al.

[11] Patent Number: 5,471,031
[45] Date of Patent: Nov. 28, 1995

[54] CHAMBER FREE PLASMA WELDING ROOT SIDE PURGING METHOD AND APPARATUS

[75] Inventors: J. R. Dailey, Washington, D.C.; William F. McGee, Decatur; Daniel J. Rybicki, Huntsville, both of Ala.

[73] Assignee: The United States of America as represented by the Administrator of the National Aeronautics and Space Administration, Washington, D.C.

[21] Appl. No.: 158,331

[22] Filed: Nov. 29, 1993

[51] Int. Cl.$^6$ .................................................. B23K 10/00
[52] U.S. Cl. ................ 219/121.46; 219/121.45; 219/121.59; 219/121.51
[58] Field of Search ............... 219/121.59, 121.45, 219/121.46, 121.53, 121.54, 121.48, 74, 75

[56] References Cited

U.S. PATENT DOCUMENTS

| | | | |
|---|---|---|---|
| 2,844,707 | 7/1958 | Mazzagatti | 219/74 |
| 2,918,563 | 12/1959 | Ternisien et al. | 219/74 |
| 3,317,704 | 5/1967 | Browning | 219/121.46 |
| 3,450,857 | 6/1969 | Webb | 219/74 |
| 3,614,378 | 10/1971 | Goodell | 219/75 |
| 4,023,006 | 5/1977 | West et al. | 219/121.54 |
| 4,078,167 | 3/1978 | Baras et al. | 219/75 |
| 4,278,864 | 7/1981 | DeFacci et al. | 219/74 |
| 4,866,236 | 9/1989 | De Nale et al. | 219/74 |
| 5,290,989 | 3/1994 | Zibilich et al. | 219/74 |

*Primary Examiner*—Mark H. Paschall
*Attorney, Agent, or Firm*—Robert L. Broad, Jr.

[57] ABSTRACT

A method and apparati are presented for non-chamber root side purging in fusion welding of oxygen reactive metals which require that the molten weld zone and local solid areas of the weld seam remaining at high temperatures be shielded from normal atmosphere to prevent degradation of the welded area. The apparatus provides an inert atmosphere to the root side of a weld joint through a porous medium whereby the jet-like thrust of the plasma arc actually draws the continuously supplied inert atmosphere into the path of the molten or high temperature solid weld zone. The porous medium is configured so it can be placed at the borders of the weld seam and substantially parallel to the seam without restricting the view of the root side of the seam. The inert gas is dispersed evenly through the porous media and across the weld seam, at the point of arc penetration and in front of and behind the arc. The apparatus can be constructed so as to limit the amount of inert gas flow and can be mobile and travel synchronously with the welding arc.

18 Claims, 1 Drawing Sheet

U.S. Patent      Nov. 28, 1995      5,471,031
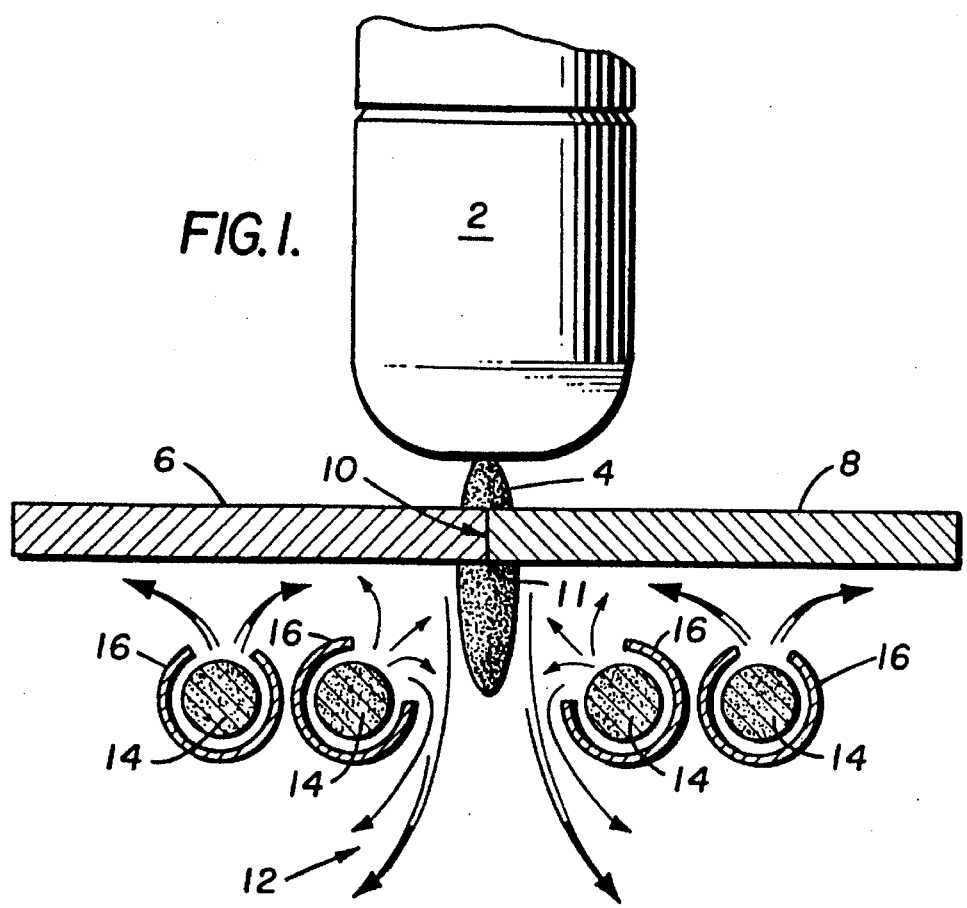
FIG. I.
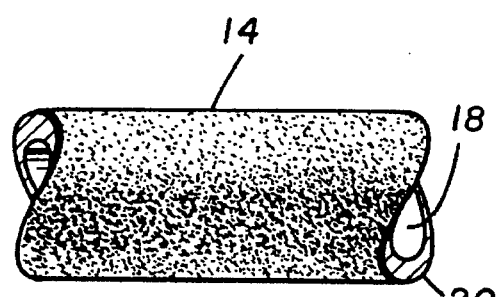
FIG. 2.
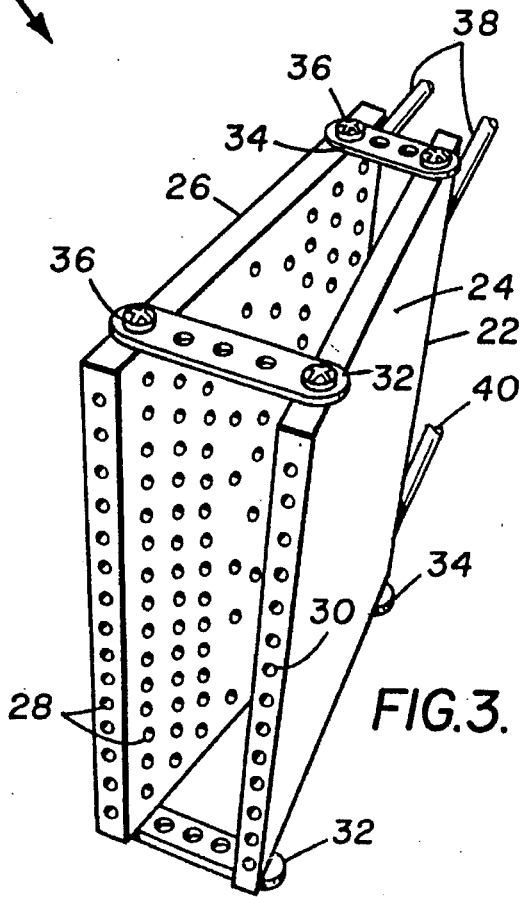
FIG. 3.

CHAMBER FREE PLASMA WELDING ROOT SIDE PURGING METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

BACKGROUND OF THE INVENTION

1. Field of the Invention

The present invention relates to a chamber free gas purge method and apparatus for establishing an inert atmosphere zone at the root side of a weld seam. In another aspect, the invention relates to the concept of strategically providing an inert atmosphere to the root side of a weld joint through a porous medium whereby the jet-like thrust of a plasma arc draws the continuously supplied inert atmosphere into the path of the molten or high temperature solid weld zone. In yet another aspect, the invention relates to a chamber free provision of an inert atmosphere on the root side of a fusion welding which permits open view of the welding seam.

2. Description of Related Art

Fusion welding of oxygen reactive materials such as aluminum-lithium alloys, titanium and the like, requires that the molten weld zone and the local solid areas at high temperatures be shielded from the normal atmosphere or oxygen to prevent degradation of the welded area so as to avoid producing weld discontinuities and other potential defects. Full penetration welding of these reactive materials with a plasma arc welding process, in the "keyhole mode", requires that the root side of the joint be shielded with relative precision due to the additional implications brought on by the plasma arc thrusting to the root side of the weld seam. Most current root side welding methods involve encasing a section of or the entire length of the root side weld seam in a chamber which is purged with inert gas until the atmosphere contained within is relatively free of oxygen. These chambers may be fixed to the weld tooling or may be mobile and travel synchronously with the welding arc.

As the need for lighter and/or stronger materials has increased, particularly with regard to aerospace constructions, the interest in and the use of titanium and its alloys, likewise, has been increased. Although titanium and titanium alloy work pieces have the desired and needed characteristics of exceptional tensile strength and heat resistance, said work pieces are susceptible to atmospheric contamination during welding. Accordingly, in joining said work pieces by welding, it is generally necessary to weld the work pieces in a rigid chamber which has been purged of ambient air through use of inert gas. Use of the chamber requires enormous waste of time and waste of the purging inert gas used.

The above-described root side purging chamber utilization has further undesired aspects. The atmosphere contained within the chamber must be monitored for pressure and for oxygen content. The chambers, depending upon the configuration, will restrict viewing of the root side of the welding operation partially or fully, unless a fully transparent chamber is utilized. Viewing the root side of the plasma arc weld during full penetration is generally considered to be the best method of monitoring arc to seam alignment and penetration characteristics. The inert gas consumption requirement of these chambers is relatively large due to requirements of maintaining a low oxygen level.

Several approaches have been utilized to modify the burden of the welding chamber such as by an inflatable, inert gas purged welding chamber assembly. The welding chamber of the assembly is defined by a collapsible, reusable inflatable member. In another approach, a purge gas unit establishes an enclosed zone for purge gas within tubes or pipes having portions which are to be joined by welding. The purge gas unit includes a first bladder positioned on one side of the welding location and a second bladder positioned on the other side of the location.

It is, therefore, readily apparent that what is needed in the art, and is not currently available, is an apparatus and method which eliminate the aforementioned disadvantages and which also permit the uncontaminated welding of titanium, titanium alloys, aluminum-lithium alloys and the like, and other work pieces of other metals and metal alloys which are reactive base materials in the presence of oxygen.

SUMMARY OF THE INVENTION

The instant invention permits the welding in an inert gas environment of work pieces of metal and metal alloys which are susceptible to atmospheric contamination during welding, without the use of either a rigid chamber or of shielding, inexpensively, quickly, and without the use of any undue loss of the inert gas used in the welding environment, either for purging or for welding.

These benefits can be achieved by the present invention which involves the concept of strategically providing an inert atmosphere to the root side of a weld joint through a porous medium whereby the jet-like thrust of the plasma arc actually draws the continuously supplied inert atmosphere into the path of the molten or high temperature solid weld zone. Two mechanisms in accordance with the invention which share a common methodology are discussed under the appropriate terminology of sparge tube purging and open view purging. The sparge tube purging mechanism and the open view purging device both utilize a porous medium through which inert gas is channeled. The porous medium is configured so it can be placed at the borders of the weld seam and parallel to the weld seam without restricting the view of the root side of the seam. The inert gas is dispersed evenly through the porous medium and across the weld seam at the point of arc penetration and in front of and behind the arc. The jet-like thrust of the plasma arc creates a drawing action upon the inert gas and continuously provides an oxygen-free atmosphere to the molten and/or high temperature weld metal. With an adequate and continuous gas flow, the plasma arc can only draw in the inert blanket gases to form a true purging or inert atmosphere. In addition, these apparatus do not require precise monitoring of pressure or oxygen content as these two variables are virtually eliminated. The apparatus according to the invention can be made relatively small and therefore will require a limited amount of inert gas flow to function successfully and they can be fashioned so that they are mobile and travel synchronously with the welding arc.

The invention apparatus and methodology can also be adapted to other welding processes which are required for welding of reactive materials where intense heat from the welding process is transferred to the root side of the weld joint utilizing such processes where the welding arc is not projected and open to the root side. Such utilization may require slight modifications of the inventive apparatus, however, the general concept would be available and sufficient to provide through a specifically configured directional flow mechanism which will ensure that full inert gas coverage is achieved.

The inventive apparatus and methodology would be applicable to all aerospace, defense related and commercially welded products fabricated from a reactive metal and where plasma arc welding is utilized as the joining process. Any plasma arc welding applications on products which have critical design, processing and inspection requirements would benefit from the root side purging apparatus. For example, the Space Shuffle external tank fabrication from aluminum is one primary candidate which would possibly use a new aluminum-lithium material requiring utilizing plasma arc welding.

These and other features and advantages of the present invention will become apparent to those skilled in the art upon reading of the following detailed description and when taken in conjunction with the drawings wherein there is shown and described various embodiments of the invention.

BRIEF DESCRIPTION OF THE DRAWINGS

In the course of the following detailed description, reference will be made to the attached drawings wherein:

FIG. 1 is a side elevational view, in simplified pictorial and schematic form, partially fragmental of an embodiment of the invention showing inert gas being drawn to a weld seam by a plasma arc plume;

FIG. 2 is a side elevational view in simplified form, and enlarged and not to scale, of a section of a porous metallic tubing which is shown in FIG. 1 as a means for supplying an inert gas blanket to the weld seam;

FIG. 3 is a perspective view of another embodiment of the invention, an open view inert gas purging apparatus formed of porous metallic plates which provide an inert gas blanket in the weld seam zone.

DESCRIPTION OF THE PREFERRED EMBODIMENTS

In the following description, like reference characters designate like and corresponding parts throughout the several views of the drawings.

The side elevational view of FIG. 1 presents the sparge tube mechanism wherein plasma arc welding torch 2 provides a plasma arc 4 to the discontinuous first reactive metal segment 6 and second reactive metal segment 8 for welding joinder. The welded joint along weld joint 10 is accomplished through full penetration welding of the reactive metals with the plasma arc welding process in the "keyhole mode" which requires the weld joint root side 11 to be shielded with relative precision due to the additional implications brought on by plasma arc thrusting through to the root side of the weld seam. In fusion welding of oxygen reactive materials, the molten weld zone and local high temperature solid areas must be shielded from normal atmosphere to prevent degradation of the welded area to avoid producing weld defects.

The plasma arc plume 12 draws inert gas which flows from the porous metal tubes 14. The porous metal tubes 14 can be supplied with gas flow shrouds 16 which direct and economize the flow of inert gas in creating an inert gas blanket atmosphere in the region or zone of the weld. With such a supply of inert gas, the plasma arc plume 12 draws the gas to the weld zone, thus creating an enhanced inert blanketing gas atmosphere in front of, around and following the plasma arc plume 12.

In FIG. 2, the porous metal tube 14 is presented in an enlarged not to scale side elevational view. A section of the porous metal tube 14 is presented having a porous metal tube cavity 18 and a porous metal tube wall 20. Such a porous metal tube 14 is shown in operative position in FIG. 1 as a means for supplying inert gas atmosphere or blanket to the weld seam zone. The porous metal tubing 14 can be comprised of sintered metal which allows the permeability of gases through the tubing wall 20 either by the action of pressure in the porous metal tube cavity 18 and/or in combination with outside force such as that of the plasma arc plume 12 which has a jet-like thrust and draws inert gas to the weld seam zone. Such porous metal tubing 14 could be constructed with, for example, an inside diameter of ⅜" and an outside diameter of ½". Typically, multiple tubing within the environment of the invention is capable of supplying approximately 100 cubic feet per hour inert gas. Such dimensions obviously can be varied in order to accommodate multiple welding torches and/or reactive base material thicknesses and other welding variables.

A perspective view of another embodiment of the inventive apparatus is presented in FIG. 3, the open view purging apparatus. The open view purging assembly 22 is comprised of a first porous metal plate 24 and a second porous metal plate 26 which are spaced apart to accommodate, for example, a plasma arc plume, while providing an inert gas atmosphere which can be enhanced by the jet-like thrust of the plasma arc plume. The first and second porous metal plates are porous on facing surfaces and can be porous along the thickness of the plates which define chambers therein. The first porous metal plate 24 and the second porous metal plate 26 accommodate various numbers and sizes of plate pores 28 and 30 which communicate to gas filled chambers defined within the two metal plates. These plate pores provide inert gas blanketing of the root side portion of the weld seam and can be controlled by internal pressure, number of pores, size of pores, spacing of the plates 24 and 26, as well as the plasma arc plume thrust. The first porous metal plate 24 and the second porous metal plate 26 are maintained at specific and yet adjustable spacing by mounting members 32 and 34. These mounting members are affixed to the first, porous metal plate 24 and second porous metal plate 26 by mounting member fasteners 36. The open view purging assembly 22 and first porous metal plate 24 and second porous metal plate 26 are provided with an inert gas outlet and inlet tubing 38 and 40.

The chamber free fusion welding root side purging method and apparatus presented in both the sparge tube purging apparatus and the open view purging assembly 22 utilize a common methodology and provide a porous medium through which inert gas is channeled. The porous medium can be placed along the borders of the weld seam and parallel to the weld seam without restricting the view of the root side of the seam while enhancing the inert gas blanket. The enhancement of the inert gas blanket is achieved through efficient localization of the inert gas which is further enhanced at the point of arc penetration, as well as in front of and behind the arc through the jet-like thrust of the plasma arc which creates a drawing action upon the inert gas and continuously provides an oxygen-free atmosphere to the molten and/or high temperature weld metal. Within the inert gas blanket provided by continuous gas flow, the plasma arc can draw such blanket and focus or localize, i.e., concentrate the inert gas atmosphere to the zone of the weld. Such apparatus and methodology does not require inefficient amounts of inert gas and eliminates the need for various controls now necessary for known systems. Furthermore, the ability of operator open viewing of the root side of plasma arc welding seams within the inert atmosphere avoids many, if not most, of the defects of weld seams occurring in presently used chambers. Not only can quick adjustments of the welding process be achieved, but avoidance of continuous defective weld seams is possible.

it is obvious that many embodiments may be made of this inventive concept and that many modifications may be made in the embodiments hereinbefore described. Therefore, it is to be understood that all descriptive materials herein are to be interpreted merely as illustrative, exemplary and not in a limited sense. It is intended that the various modifications which might readily suggest themselves to those skilled in the art be covered by the following claims, as far as the prior art permits.

We claim:

1. A chamber free root side inert gas purging apparatus for plasma arc welding of reactive base materials, comprising:

a plasma arc welding torch for providing plasma arc penetration welding of reactive materials;

porous medium means for supplying inert gas blanket to the root side of the penetration welding and welding seam, said porous medium means positioned substantially parallel to borders of the weld seam allowing unobstructed view of the root side of the weld seam;

means associated with said porous medium gas supply means and means for supporting same which allow for mobility and travel synchronously with the welding arc; and a continuous source of inert gas for use in blanketing the weld seam root side.

2. The chamber free apparatus according to claim 1, wherein the porous medium means for supplying inert gas blanket to the penetration welding root side is comprised of hollow tubes having porous walls which are permeable to gas flow.

3. The apparatus according to claim 2, wherein the porous tube walls are comprised of sintered metal.

4. The apparatus according to claim 2, wherein the porous tubes permeable to gas flow are mounted substantially parallel to the border of the weld seam and are mounted with shrouds which direct the inert gas flow toward the plasma arc weld plume which draws the inert gas from the porous tubes.

5. The apparatus according to claim 4, wherein at least one parallel porous metallic tube on each side of the weld seam root side dispense inert gas toward the plasma arc plume and the reactive base materials which are to be welded.

6. The apparatus according to claim 2, wherein the inert gas flow through the porous tubes is regulated through gas pressure control means.

7. The apparatus according to claim 1, wherein the porous medium means for supplying inert gas is comprised of a first porous metal plate having a gas cavity therein and a second porous metal plate having a gas cavity therein, the first and second porous metal plates arranged in a facing position wherein the facing surfaces of the first and second porous metal plates contain plate pores said porous metal plates being spaced apart and maintained in a definitive spacial relationship by mounting members; the first porous metal plate and the second porous metal plate having gas inlet and outlet means for providing a continuously flow and supply of inert gas.

8. The apparatus according to claim 7, wherein the first porous metal plate and the second metal plate have additional pores in first end portions as opposed to second end portions which accommodate the inert gas inlet and outlet means.

9. The apparatus according to claim 7, wherein the first porous metal plate and the second porous metal plate can be mounted substantially parallel and on either side of the root side weld seam.

10. The apparatus according to claim 7, wherein the first porous metal plate and the second porous metal plate can be mounted with facing surfaces angled toward one another and yet spaced sufficiently apart so that the edges of the first porous metal plate and second porous metal plate which abut the root side weld seam are sufficiently spaced apart as to avoid encroachment upon the weld seam.

11. A chamber free root side inert gas purging method for plasma arc welding of reactive base materials, comprising:

a) bringing two reactive metal surfaces together for welding with a plasma arc welding torch;

b) generating a plasma arc plume penetrating between the two reactive metal surfaces;

c) welding of the reactive metal surfaces through plasma arc penetration welding;

d) providing inert gas to the penetration welding plasma arc and welded seam;

e) creating an inert gas atmosphere along the root side of the weld seam;

f) drawing the inert gas to the weld seam while the plasma arc plume penetrates the weld seam; and g) creating a concentrated inert gas blanket along the weld seam at the point of arc penetration and in front of and behind the arc.

12. A method in accordance with claim 11, wherein provision of inert gas to the penetration welding plasma arc and welded seam is through pressurized gas flow from prepositioned gas permeable hollow tubes, with at least one positioned on either side of the welded seam.

13. The method according to claim 12, wherein the inert gas flow from the hollow porous tubes is directed to the plasma arc and welded seam by directional shrouds.

14. The method according to claim 11, wherein the hollow porous tubes are capable of traveling in synchronization to the travel of the plasma arc.

15. The method according to claim 11, wherein the inert gas is directed to the penetrating welding plasma arc and welded seam without obstructing the view of the root side welded seam.

16. The method according to claim 12, wherein the inert gas flow through the hollow porous tubes is through varying the pressure of the gas to the tubes.

17. The method according to claim 11, wherein the inert gas atmosphere along the root side of the weld seam is further concentrated and focused at the penetrating welding plasma arc plume.

18. A chamber free inert gas purging apparatus for plasma arc welding of reactive base materials, comprising:

a plasma arc welding torch for providing plasma arc welding of reactive materials;

porous medium means for supplying inert gas blanket to the root side of a nonpenetration welding seam, said porous medium means positioned substantially parallel to borders of the weld seam allowing unobstructed view of the root side of the weld seam;

means associated with said porous medium gas supply means and means for supporting same which allow for mobility and travel synchronously with the welding arc; and a continuous source of inert gas for use in blanketing the weld seam root side.

\* \* \* \* \*

UNITED STATES PATENT AND TRADEMARK OFFICE
CERTIFICATE OF CORRECTION

PATENT NO. : 5,471,031
DATED : November 28, 1995
INVENTOR(S) : William F. McGee and Daniel J. Rybicki It is certified that error appears in the above-identified patent and that said Letters Patent are hereby corrected as shown below:

On the title page: Item [75] should read

William F. McGee and Daniel J. Rybicki.

Item [19] should read --MCGee et al--.

Signed and Sealed this

Sixteenth Day of April, 1996

Attest:

BRUCE LEHMAN

*Attesting Officer*            *Commissioner of Patents and Trademarks*